May 2, 1967 F. G. KERBY 3,317,237
OPEN-VIEW VEHICLE SEATING CONSTRUCTION
Filed Aug. 13, 1965 3 Sheets-Sheet 1

INVENTOR.
Floyd G. Kerby
BY
John B. Sowell
ATTORNEY

May 2, 1967  F. G. KERBY  3,317,237
OPEN-VIEW VEHICLE SEATING CONSTRUCTION
Filed Aug. 13, 1965  3 Sheets-Sheet 2

INVENTOR.
Floyd G. Kerby
BY
John B. Sowell
ATTORNEY

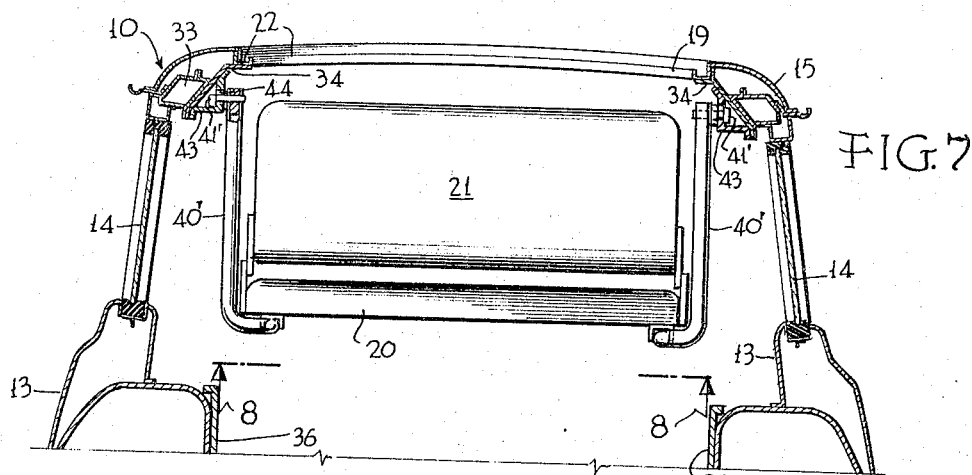

United States Patent Office 3,317,237
Patented May 2, 1967

3,317,237
OPEN-VIEW VEHICLE SEATING CONSTRUCTION
Floyd G. Kerby, Orchard Lake, Mich., assignor to The Budd Company, Philadelphia, Pa., a corporation of Pennsylvania
Filed Aug. 13, 1965, Ser. No. 479,470
17 Claims. (Cl. 296—63)

This invention relates to an open-view vehicle seating construction, particularly to a seating construction which provides an above-roof or vista view from a passenger seat, and has for an object the provision of improvements in this art.

It is generally considered that an open view from a travelling vehicle is a desirable accommodation, particularly in good weather. Convertible automobiles provide such accommodations when the top is folded back. Some cars provide a shiftable roof panel which to some extent provides the same type of accommodations. Vehicles which have a rigid roof structure, like sedans and station wagons, are not easy to equip with open-view seating arrangements because the roof strength and seal must be kept unimpaired and the interior space must not be obstructed by fixed seating accommodations in the upper portion of the interior space. Consequently, so far as known, there have been few if any, serious proposals for furnishing open-view seating accommodations for rigid-top vehicles.

According to the present invention, there is provided a construction which does furnish a convenient and satisfactory open-view or vista seating arrangement for some of the passengers in a rigid-top type vehicle. The construction provides a roof opening with a closure which can readily be raised to permit the passage of the heads or torsos of passengers, which forms a transparent windshield when raised, which closure completely seals the opening when closed, and with the opening suitably framed to avoid undue weakening of the top and body because of the access opening. The seat is arranged to place the passenger at a proper height to permit at least the head to be positioned above the opening, yet sufficiently low for the passenger to get in and out of the seat from the inside of the car while the seat is in usable position. The seat is arranged to be removably secured to suitable strength frame elements of the vehicle, as by anchorage to longitudinal frame side elements above or below the side window zone. Means are also provided for furnishing comfortable foot rests for the passengers when seated.

The general and specific objects of the invention, as well as various features of novelty and advantages, will be apparent from the following description of an exemplary embodiment, reference being made to the accompanying drawings, wherein:

FIG. 6 is a view like FIG. 1 but showing a modified form of seat support;

FIG. 7 is a transverse vertical section taken on the line 7—7 of FIG. 6;

FIG. 8 is a bottom plan view of the seat, the view being taken on the line 8—8 of FIG. 7;

FIG. 9 is a side elevation of a seat with a folding foot rest;

FIG. 10 is a side elevation of a seat with socket-held removable back rest, foot rest, and support members.

Figure 1:
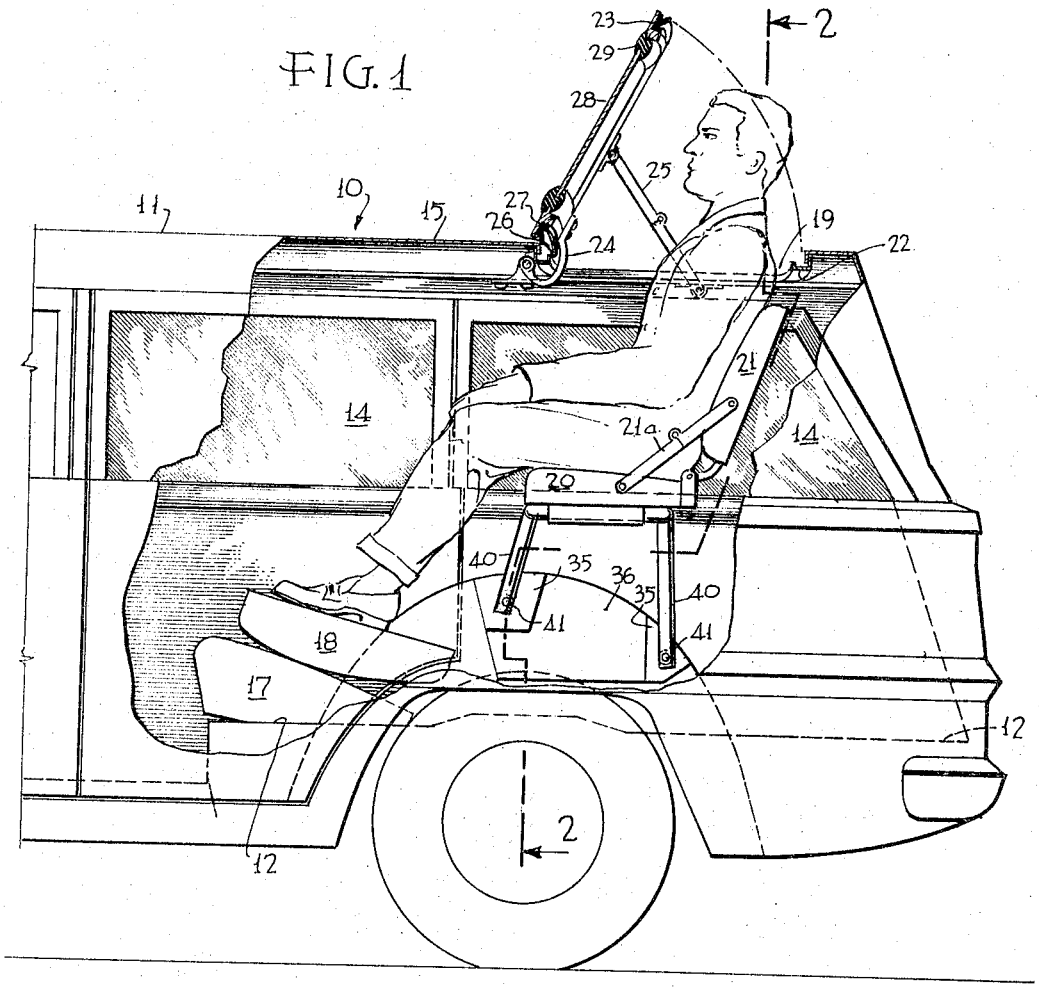
FIG. 1 is a diagrammatic side elevation, partly in section, of a vehicle having open-view seating accommodations embodying the present invention.
Figure 3:
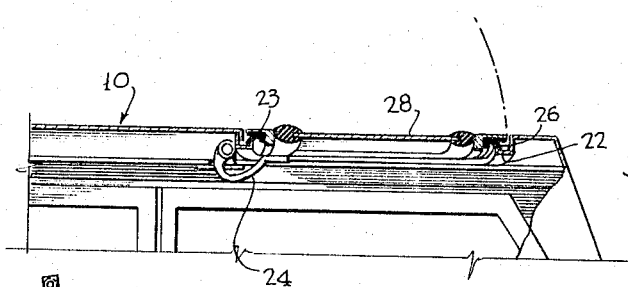
FIG. 3 is a partial section, like the upper part of FIG. 1, but with the closure-windshield closed.
Figure 5:
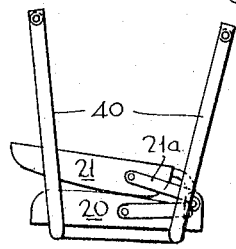
FIG. 5 is a reduced side elevation of the seat assembly alone in folded condition.

As shown in the drawings, a vehicle 10, here a station wagon, has a rigid body 11 with a floor 12, side walls 13 with windows 14, a rigid roof 15, a front seat (not shown) for the driver, and a rear seat 17 which has a foldable back rest 18.

According to the present invention, a roof opening 19 is provided above and somewhat behind the rear seat so the back rest 18 of the rear seat, when folded down, will provide a foot support for reaching an open-view seat 20, with a back rest 21 held by breakable brace struts 21a, which is removably supported beneath the roof opening.

As shown, the seat 20 is located at such height that the head of a passenger seated thereon is located above the roof line; but, at the same time, the seat is disposed at such a distance below the roof opening that sufficient space is provided for a passenger to enter and leave the seat while it is in its usable position.

The roof opening 19, on all sides, is provided with a relatively rigid and strong drain and sealing gutter 22 with a suitable drain pipe or pipes to the side (not shown); and a strong closure 23 is hinged, as at 24, to selectively occupy a lower closed position or an upper raised position where it forms a slanting windshield in front of the roof opening. Suitable means, such as foldable strut braces 25, are provided for holding the closure in its raised position. Sealing means 26 is provided for all sides for sealing around the closure when lowered, it being held closed by any suitable latch means (not shown). The opening and its closure so much resemble the rear trunk compartment opening and its lid of automobiles in its hinging, sealing, draining, and latching details that it is thought to be unnecessary to illustrate such details extensively herein.

The closure includes a strong rigid frame 27 which carries a transparent panel 28, as by rubber molding 29 of well-known type. Desirably, the panel or pane 28 is very strong, as of thick shatter-proof glass or plastic, to protect the passenger and to resist breakage when loaded as a part of the roof. The roof opening is long enough to provide ample space in front of the passenger when seated. A substantial rail (not shown) is normally provided on the roof of a station wagon, and it would be disposed around the opening hereby provided.

The seat 20 is removably supported from the sidewalls of the vehicle in any suitable way, as at one of the longitudinal frame elements on either side above and below the window.

In order to strengthen the body in compensation for the opening 19, the upper longitudinal roof-to-side beams 33 may be made of large size and of hollow section, as of flanged channels welded together, and inner reinforcing panels 34 secured interiorly. The reinforcing panels extend across the top in front and behind the opening 19 to fully compensate for the rigid top structure which is omitted (if factory built) or removed (if added later). Anchorage elements 35 are provided if the seat is to be supported from below and these may be located in reinforcing members 36 secured to the sides, as to the fender wells.

The seat 20 is provided with extended supports 40 secured to the seat in any suitable way, as by hinging to the lower side, the supports having projections 41 at their ends if the seat is to be supported from below, or with headed projections 41′ on the supports 40′ (FIGS. 6 and 7) if the seat is to be supported from above. The upper reinforcements have brackets 43 which may be provided with holes 44 for the projections 41' of the supports 40'.

Figure 2:
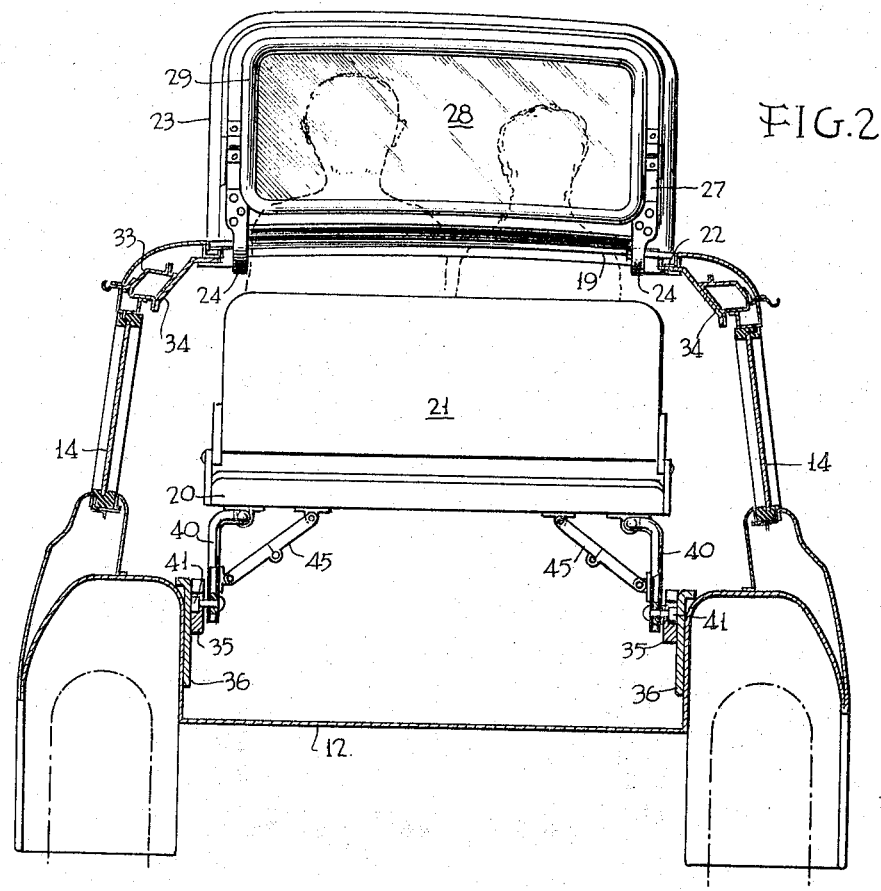
FIG. 2 is a vertical transverse section taken on the line 2—2 of FIG. 1.
Figure 4:
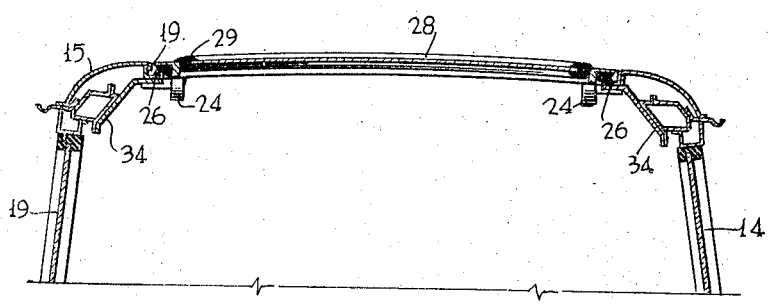
FIG. 4 is a transverse vertical section taken on the line 4—4 of FIG. 3.

The supports 40 (FIGS. 1 and 2) may be held in the use position by break brace structs 45.

The supports 40' (FIGS. 7 and 8) are so formed and hinged that they brace against the ends of the seat when they are disposed in the use position in order to prevent side sway.

If the supports 40' are used for suspension they need not be as rigid as if used for support from below (40) and might simply be cables with hooks, side brace members being used for steadying the ends of the seat from the side walls of the car if cables are used. This would reduce the weight of the removable seat assembly and require less weight for storage.

The seat location in the station wagon illustrated is such that the back of the rear seat back rest is located in front of the removable open-view seat, hence it can conveniently be used as a step and foot rest for the passenger. For a more elevated foot rest, as for passengers with shorter legs, a foldable and adjustable foot ret of any suitable type (not shown) may be mounted on the back rest 18. This may extend entirely across the back rest to serve more than one passenger or may consist of two separated units to serve passengers separately.

In cases where there is no convenient foldable seat back rest 18 in the car, a foldable foot rest 47 (FIG. 9) may be hinged to the removable seat to fold over in any convenient way and brace from the seat, as by hinged break struts 46, when the use position. It is shown to be foldable up under the seat.

FIGS. 6–8 show the supports 40' to be connected together at each end, as by a part 40a' which may seat in a socket member 42 so the seat may be set down, as in cradles. If desired, the parts 40a' may be hingedly held if the socket members are enclosed over the connecting part.

FIG. 10 shows a modification in which the seat 20" has its back rest 21" provided with projections 48 which fit in tubular sockets 49 carried by the back of the seat, hand screws 50 being used to hold the projections in the sockets. Similarly, the supports 40" have upper end projections which fit in tubular sockets 51 secured to the ends of the seats, the projections being held by hand screws 52. A foot rest 53 has projections 54 which fit in tubular sockets 55 carried by the front portion of the seat, the projections being held in the sockets, as by hand screws 56. A unit like this, with completely separable parts, has the advantage of lightness, as a single unit, and ease of storage. In some respects it is simpler and more rigid when assembled.

The foldable open-view seat can be quickly mounted or removed from inside the vehicle and can readily be stowed in the vehicle or taken out and stowed elsewhere when not wanted in the vehicle. If its parts are separate units, as suggested above, it may be convenient to provide a storage box to keep all of the parts together when not in use.

The top closure can be opened or closed, even when the removable seat is not used, to provide an overhead opening for passengers in the regular rear seat of the car, if desired. The present accommodations, when not used, leave the vehicle completely open and clear for use, just as it would have been if the accommodations had not been provided. In fact, the top opening permits taller objects to be carried than if a solid roof were present. And the side wall and roof reinforcements make the body stronger and more rigid.

It is not always necessary to secure a back rest to the removable seat. It may be a separate unit which is secured to the rear margin of the room opening or to the sides of the vehicle, as by convenient hooks. It would be easy to pad the rear edge of the top opening beneath and inside the gutter and seal to provide a back rest. Preferably, safety straps (not shown) are provided on the removable seat in the same way that such straps are provided for usual seats.

The low seating position keeps the passenger's head at a low level as a safety feature, the car itself having a low roof line, and thus minimizes accidents from overhead obstructions. The substantial windshield protects the passenger in most cases if a very low obstruction should be hit. The passenger's head (and also the windshield, usually) will be below the top of a garage opening.

It is thus seen that the invention provides very desirable open-view accommodations for vehicles, the equipable open-view accommodations for vehicles, the equipment being simple and inexpensive and easily installed and removed. The normal use of the vehicle is not impaired by the provision of the auxiliary equipment, and, in fact, is improved for normal use.

While certain embodiments of the invention have been disclosed for purposes of illustration, it is to be understood that there may be various other embodiments and modifications within the general scope of the invention.

I claim:

1. Open-view seating accommodations for a vehicle having a body with a floor, sides with window openings, longitudinal side frame members above and below the window openings, and a rigid roof, comprising in combination, a frame forming an opening in the roof, the opening frame providing a gutter with drain and a sealing border, a closure hinged at the front of said opening and having a peripheral seal with said frame when closed, means supporting said closure in an inclined position as a windshield when raised in front of said opening, a passenger seat, and means supporting said seat at an elevation below said opening in a position to dispose the head of an occupant of the seat above the roof in said opening and allowing body access of the occupant below and behind the front edge of the opening and above the top of said seat.

2. Open-view seating accommodations for a vehicle as set forth in claim 1, further characterized by the fact that said seat is supported by the side frame members above said side windows.

3. Open-view seating accommodations for a vehicle as set forth in claim 1, further characterized by the fact that said seat is supported by the side frame members on an anchorage located below said side windows.

4. Open-view seating accommodations for a vehicle as set forth in claim 1, further characterized by the fact that said frame members include side rails above the windows formed as a closed box section structure, that a reinforcing sheet is secured within said side rails and extends to the side of the roof opening, said reinforcing sheet having anchorages with openings therein, said seat being supported by projecting members extending into said openings and carried by said anchorages.

5. Open-view seating accommodations for a vehicle as set forth in claim 1, further characterized by the fact that said side frame members below the windows include a reinforcing sheet having seats for projecting seat support members therein, said seat having projecting supporting members extending into said sheet seats and supported by said anchorages.

6. Open-view seating accommodations for a vehicle as set forth in claim 1, in which said seat includes a back rest secured thereto.

7. Open-view seating accommodations for a vehicle as set forth in claim 1, which further includes a foot rest disposed in front of and below said removable seat.

8. Open-view seating accommodations for a vehicle as set forth in claim 1, in which said vehicle has a rear seat with a fold-down back rest positioned below and in front of said removable seat and providing a foot rest for passengers seated in said removable seat.

9. Open-view seating accommodations for a vehicle having a body with a floor, sides with window openings, side frame members on said sides above and below said window openings, and a rigid roof, said roof having a roof opening toward its rear end, framing means strengthening the roof around the opening and down along the side frame members at the top of said window openings, a seat disposed below said roof opening at an elevation to expose the head of a seat occupant above the top of the roof, means supporting said seat inside the vehicle, and closure means for said opening movable from a closed sealing position over said opening to a raised position in front of the opening, said opening being of such length in front of said seat and being at such height above the seat as to provide access for the occupant to and from the seat from inside the vehicle.

10. Open-view seating accommodations for a vehicle as set forth in claim 9, which further comprises, a back rest disposed behind the back of said seat.

11. Open-view seating accommodations for a vehicle as set forth in claim 9, which further comprises, a back rest movably mounted on the back of said seat.

12. Open-view seating accommodations for a vehicle as set forth in claim 9, which further comprises, foot rest means disposed below and in front of said seat.

13. Open-view seating accommodations for a vehicle as set forth in claim 9, which further comprises, a foot rest movably mounted on said seat and disposed below and in front of said seat.

14. Open-view seating accommodations for a vehicle as set forth in claim 9, which further comprises, elongated seat supports for said seat movably mounted thereon.

15. Open-view seating accommodations for a vehicle as set forth in claim 9, which further comprises, a back rest, a foot rest, and elongated seat supports hinged to said seat.

16. Open-view seating accommodations for a vehicle as set forth in claim 9, which further comprises, a back rest, a foot rest, and elongated seat supports removably mounted on said seat.

17. Open-view seating accommodations for a vehicle as set forth in claim 9, which further comprises, a back rest, a foot rest, and elongated seat supports having projections removably secured in tubular retainers carried by said seat.

References Cited by the Examiner
UNITED STATES PATENTS

| | | | |
|---|---|---|---|
| 1,654,878 | 1/1928 | Holler et al. | 296—66 |
| 1,751,378 | 3/1930 | Zaiden | 296—66 |
| 3,190,689 | 6/1965 | Calthorpe | 296—23 |

BENJAMIN HERSH, *Primary Examiner.*

J. H. BRANNEN, *Assistant Examiner.*